(12) United States Patent
DeAndrea et al.

(10) Patent No.: US 9,397,754 B2
(45) Date of Patent: Jul. 19, 2016

(54) LINECARDS WITH PLUGGABLE INTERFACES FOR PLUGGABLE OPTICAL AMPLIFIERS AND OTHER PLUGGABLE DEVICES

(71) Applicants: John DeAndrea, New Hope, PA (US); Massimo Di Blassio, Princeton, NJ (US)

(72) Inventors: John DeAndrea, New Hope, PA (US); Massimo Di Blassio, Princeton, NJ (US)

(73) Assignee: Finisar Corporation, Horsham, PA (US)

( * ) Notice: Subject to any disclaimer, the term of this patent is extended or adjusted under 35 U.S.C. 154(b) by 0 days.

(21) Appl. No.: 13/950,482

(22) Filed: Jul. 25, 2013

(65) Prior Publication Data

US 2014/0056593 A1 Feb. 27, 2014

Related U.S. Application Data

(60) Provisional application No. 61/675,763, filed on Jul. 25, 2012.

(51) Int. Cl.
*H04B 10/00* (2013.01)
*H04B 10/06* (2006.01)
*H04B 10/40* (2013.01)
*H04B 10/291* (2013.01)

(52) U.S. Cl.
CPC .............. *H04B 10/40* (2013.01); *H04B 10/291* (2013.01)

(58) Field of Classification Search
CPC .............................. H04B 10/291; H04B 10/40
USPC .......................................... 398/135, 161, 210
See application file for complete search history.

(56) References Cited

U.S. PATENT DOCUMENTS

| | | | | |
|---|---|---|---|---|
| 5,793,987 A * | 8/1998 | Quackenbush | ..... | G06F 13/4081 710/100 |
| 6,903,864 B1 * | 6/2005 | Sieben | ................ | H01S 3/06754 359/337.13 |
| 7,301,973 B2 * | 11/2007 | Shouji | .................. | H04B 10/506 372/20 |
| 7,471,897 B1 * | 12/2008 | Theodoras, II | ....... | H04B 10/035 398/135 |
| 7,580,637 B2 * | 8/2009 | El-Ahmadi | ........... | H04L 1/0057 398/135 |
| 7,734,183 B2 * | 6/2010 | Whitehead | ........... | G02B 6/4246 370/463 |
| 8,055,130 B2 * | 11/2011 | Yang | .................. | H04B 10/2971 398/160 |
| 8,167,505 B2 * | 5/2012 | Oki | ...................... | H01R 13/748 385/139 |
| 8,200,097 B2 * | 6/2012 | Cole | .................... | G02B 6/4246 398/117 |
| 8,300,659 B2 * | 10/2012 | Hinderthuer | .................. | 370/466 |
| 8,494,362 B2 * | 7/2013 | Hinderthuer | ....... | H04Q 11/0005 398/33 |
| 8,606,103 B2 * | 12/2013 | Friedrich | ........... | H04Q 11/0005 398/138 |
| 8,620,156 B2 * | 12/2013 | Portier | ................. | H04B 10/035 398/38 |
| 8,649,271 B2 * | 2/2014 | Jackson | .............. | H04L 12/2697 370/241 |
| 2004/0105144 A1 * | 6/2004 | Yang | .................. | H01S 3/06754 359/341.41 |

(Continued)

*Primary Examiner* — Ken N Vanderpuye
*Assistant Examiner* — Abbas H Alagheband
(74) *Attorney, Agent, or Firm* — Kurt Rauschenbach; Rauschenbach Patent Law Group, LLC (57) ABSTRACT

A linecard includes at least one pluggable device, a linecard processor, and a centralized host processor. The linecard also includes an interface that supports a pluggable device. A pluggable device is electrically coupled to the interface and is controlled by the centralized host processor. A flash memory stores data for the pluggable device. The pluggable device can include at least one of an optical amplifier and a ROADM pluggable device.

25 Claims, 7 Drawing Sheets

(56) References Cited

U.S. PATENT DOCUMENTS

| | | | | |
|---|---|---|---|---|
| 2005/0244165 | A1* | 11/2005 | Hofmeister | H04J 14/0201 398/155 |
| 2006/0147215 | A1* | 7/2006 | Hahin | H04B 10/801 398/135 |
| 2006/0277346 | A1* | 12/2006 | Doak | G06F 13/387 710/305 |
| 2007/0274350 | A1* | 11/2007 | Ghiasi | H04L 7/0807 370/516 |
| 2008/0131128 | A1* | 6/2008 | Ota | H04J 14/0201 398/79 |
| 2008/0205901 | A1* | 8/2008 | Bai | H04J 14/0201 398/155 |
| 2009/0154930 | A1* | 6/2009 | Hinderthuer | H04Q 11/0005 398/83 |
| 2009/0169206 | A1* | 7/2009 | Friedrich | H04Q 11/0005 398/49 |
| 2009/0175289 | A1* | 7/2009 | Heston | H04J 3/1611 370/419 |
| 2009/0175626 | A1* | 7/2009 | Yang | H04B 10/40 398/135 |
| 2009/0226138 | A1* | 9/2009 | Kelly | G02B 6/4204 385/89 |
| 2009/0237129 | A1* | 9/2009 | Hayashi | H04K 1/181 327/142 |
| 2010/0037008 | A1* | 2/2010 | Hattori | G06F 11/1441 711/103 |
| 2010/0061069 | A1* | 3/2010 | Cole | G02B 6/4246 361/761 |
| 2010/0067854 | A1* | 3/2010 | Oki | H01R 13/748 385/92 |
| 2011/0135312 | A1* | 6/2011 | El-Ahmadi | H04L 1/0057 398/135 |
| 2011/0182191 | A1* | 7/2011 | Jackson | H04L 12/2697 370/250 |
| 2011/0229129 | A1* | 9/2011 | Hu | H04B 10/506 398/34 |
| 2013/0243431 | A1* | 9/2013 | Pointurier | H04B 10/29 398/48 |

\* cited by examiner

LINECARDS WITH PLUGGABLE INTERFACES FOR PLUGGABLE OPTICAL AMPLIFIERS AND OTHER PLUGGABLE DEVICES

CROSS-REFERENCE TO RELATED APPLICATION

This application claims priority to U.S. Provisional Patent Application Ser. No. 61/675,763, entitled "Linecards with Pluggable Interfaces for Pluggable Optical Amplifiers and Other Pluggable Devices," filed on Jul. 25, 2012. This provisional application is herein incorporated by reference.

The section headings used herein are for organizational purposes only and should not to be construed as limiting the subject matter described in the present application in any way.

INTRODUCTION

The increasing need for high bit-rate data transmissions through optical fibers has lead to a demand for more versatile and flexible types of telecommunications equipment. In particular, there is an increasing demand for pluggable optical transceivers with standard optical pin outs and dimensions. Using standard optical pin outs and dimensions facilitates high volume manufacturing of standard products. In addition, using standard optical pin outs and dimensions gives system developers the flexibility to design complex systems with pluggable optical transceivers that support different optical transmission wavelengths and different optical characteristics.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. In the drawings, like reference characters generally refer to like features and structural elements throughout the various figures. The drawings are not intended to limit the scope of the Applicants' teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Various aspects of the present teaching are described as using telecommunications and data industry standard electronic interfaces. It is understood that the present teaching is not limited to using industry standard interfaces and, in particular, that the present teachings can be practiced with proprietary and other types of non-standard interfaces.

There are numerous types of industry standard interfaces in the telecommunication and data communication industry. Some standard interfaces provide high-speed transmission line interconnects for communicating data. Other standard interfaces provide lower-speed interfaces for monitoring and health functions of these transceivers. Still other standard interfaces provide fast serial and parallel data transfer. Optical transceivers typically include standard interfaces that support high-optical power, high-speed data transmission, and low-speed system monitoring function. Such optical transceiver standard interfaces are also well suited for optical amplifier interfaces.

Thus, one aspect of the present teaching relates to pluggable optical amplifiers that have one or more telecommunication industry standard interfaces, which can interface with linecards and other telecommunication and data networking equipment communicating with telecommunication industry standard interfaces. Numerous types of pluggable interfaces can be used with the linecard and pluggable devices according to the present teaching. For example, one or more of the following pluggable interfaces known in the art can be used with a linecard according to the present teaching: CFP, CFP2, CFP4, and XFP. One skilled in the art will appreciate that the present teaching is not limited to these interfaces.

Optical amplifiers are widely used in the optical telecommunication and data communication systems. One aspect of the present teaching is the realization that it is highly desirable for optical telecommunication and data communication systems to include linecards that have pluggable optical amplifiers with industry standard interfaces. Such linecards would greatly decrease the number of different types of linecards used in the system. Consequently, the number of spare linecards required to maintain a system would be greatly reduced. For example, if the customer uses three Erbium Doped Fiber Amplifier (EDFA) type optical amplifiers (LR, IR and SR), and each linecard has two EDFAs, the customer would then need to stock eight different linecards. Customers using linecards with pluggable optical amplifiers according to the present teaching would only need to stock one type of base linecard and three different types of EDFA pluggable optical amplifiers. Pluggable optical amplifiers according to the present teaching are highly desirable for the high-volume expandable equipment market.

Figure 1:
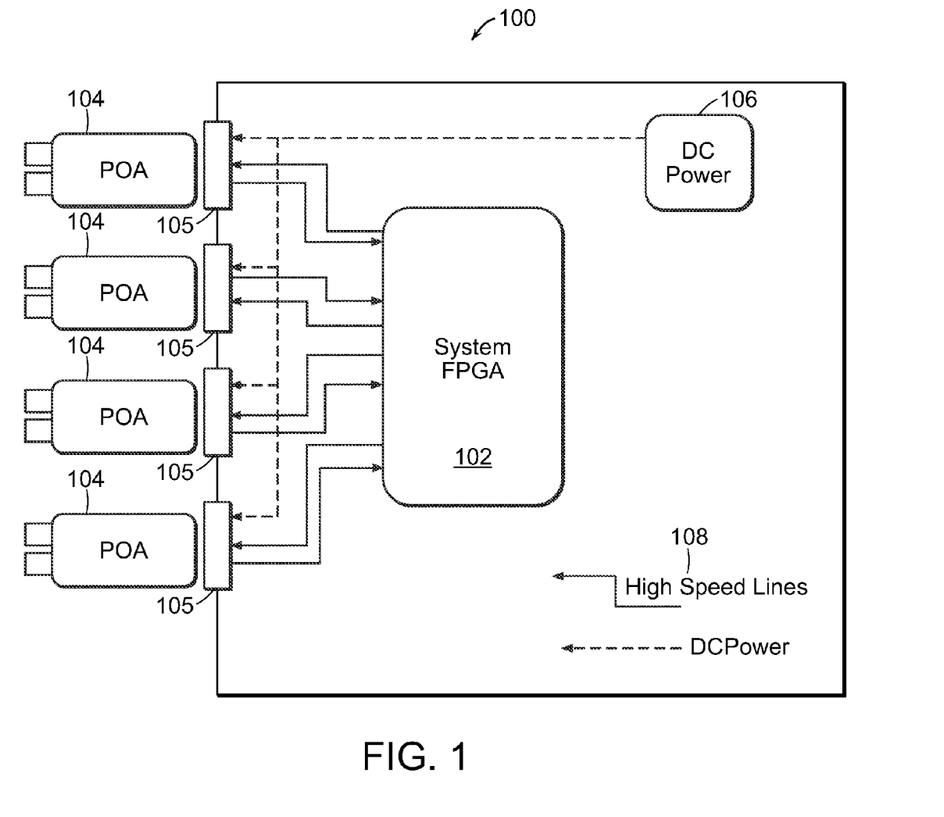
FIG. 1 illustrates a generic linecard with a host processor or field programmable gate array (FPGA) that is used to control pluggable devices, such as pluggable optical amplifiers (POAs), using industry standard interfaces.

FIG. 1 illustrates a generic linecard 100 with a host processor or field programmable gate array (FPGA) 102 that is used to control pluggable devices, such as pluggable optical amplifiers (POAs) 104, using industry standard pluggable interfaces 105. The linecard 100 is shown as including a system FPGA 102. However, in other embodiments, the linecard 100 includes a system processor. The linecard 100 includes a DC power source 106 that provides power to the linecard 100. The linecard 100 also includes high-speed data transmission lines 108. In various other embodiments, the linecard 100 can include low-speed control transmission lines.

In many known systems, the pluggable optical amplifiers typically employ microprocessor and/or field programmable gate array (FPGA) logic to control high-speed analog-to-digital converters (ADC) and high-speed digital-to-analog (DAC) converters. One aspect of the linecards of the present teaching is that the microprocessor and/or FPGA 102 is on the linecard 100 itself, and this microprocessor and/or FPGA 102 is used to (1) control functions on the linecard 100; and (2) can also be used as the main controller for the pluggable optical amplifiers 104. Using the microprocessor and/or FPGA 102 in the linecards for pluggable optical amplifiers and other pluggable devices will greatly reduce engineering time and the cost for the pluggable optical amplifiers 104 and other pluggable devices. In addition, using the microprocessor and/or FPGA 102 in the linecards for pluggable optical amplifiers 104 and other pluggable devices will simplify and reduce costs of future upgrades and improvements as market demand changes and expands, without changing the hardware and software of the pluggable optical amplifiers or other pluggable devices.

More specifically, one aspect of the present teaching relates to methods and apparatus for providing linecards with pluggable interfaces for optical amplifiers and other pluggable devices that use industry standard interfaces. However, one skilled in the art will appreciate that the present teaching is not limited to using industry standard interfaces. In one particular embodiment, the present teaching provides a means for providing a common linecard with a single or a plurality of optical amplifier interfaces. In one example of the present teaching, a Reconfigurable Optical Add/Drop Multiplexer (ROADM) linecard is provided with a single, or a plurality, of pluggable optical amplifiers, such as pluggable EDFAs. In another example of the present teaching, a common optical amplifier linecard, such as an EDFA linecard, is provided with a single, or a plurality, of pluggable optical amplifier interfaces, such as pluggable EDFA interfaces.

Figure 2:
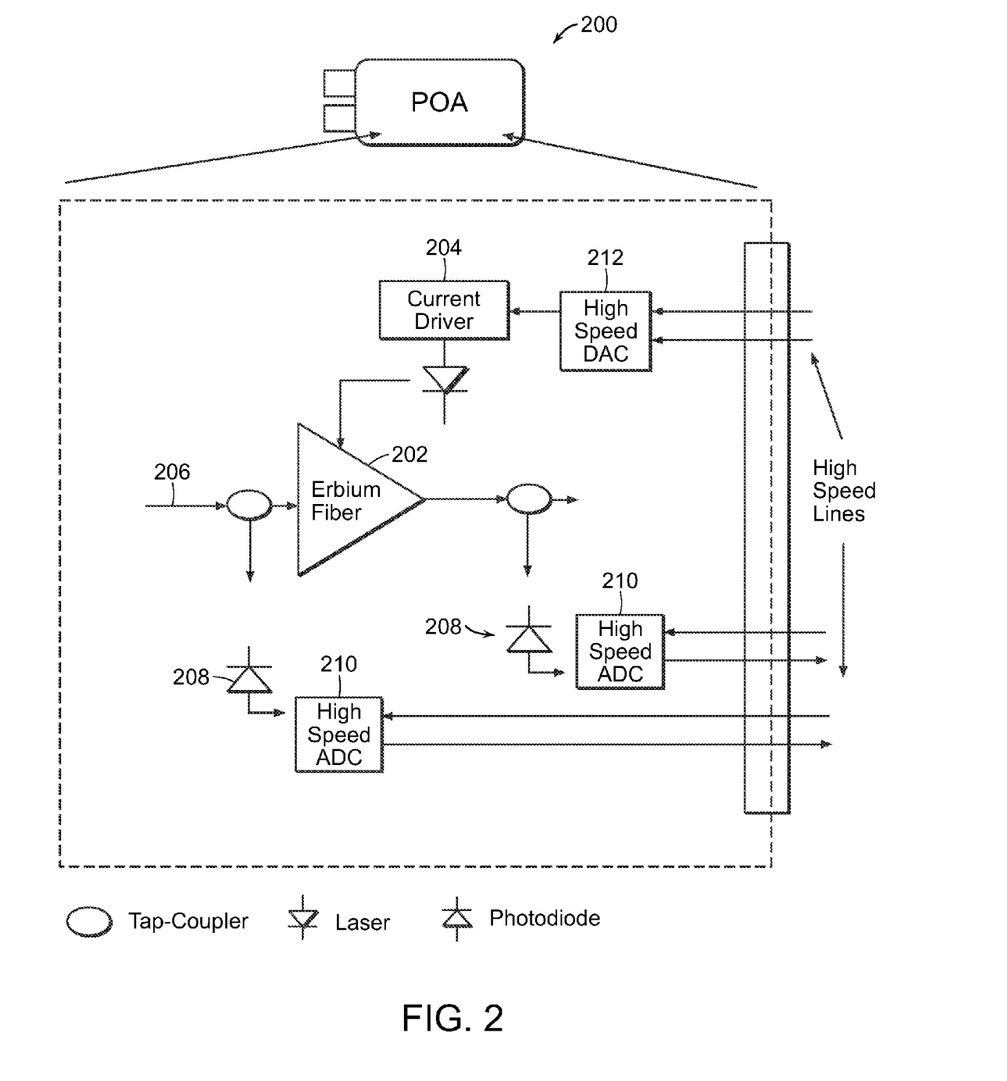
FIG. 2 illustrates a schematic diagram of an Erbium Doped Fiber Amplifier (EDFA) pluggable optical amplifier card that includes a pluggable interface according to the present teaching.

FIG. 2 illustrates a schematic diagram of an EDFA pluggable optical amplifier card 200 that includes a pluggable interface according to the present teaching. The EDFA optical amplifier card 200 includes an EDFA 202 with an associated electrical current drive circuit 204. The EDFA 202 also includes an optical input 206 and an optical pump that provides gain. Optical detector photodiodes 208, 208' detect optical power at the input and the output of the EDFA 202, respectively. The EDFA pluggable optical amplifier card 200 also includes various high-speed analog-to-digital converters 210 and digital-to-analog converters 212 that are routed through the standard RF microstrip lines. The high-speed analog-to-digital converters 210 are used to convert the analog signals generated by the photodiode detectors 208, 208' to digital signals that are routed to the electrical current drive circuit 204. The converted digital signals instruct the electrical current drive circuit 204 to control the gain and power of the EDFA 202 as well as "fast transient" response in telecommunications networks. Referring back to FIG. 1, the FPGA 102 on linecard 100 is programmed to control each of the plurality of pluggable optical amplifiers 104. Furthermore, the FPGA 102 can be controlled by a central controller or by a processor. Thus, high-speed control is enabled by an industry standard interface. The FPGA 102 can be programmed for one or more pluggable optical amplifiers.

Figure 3A:
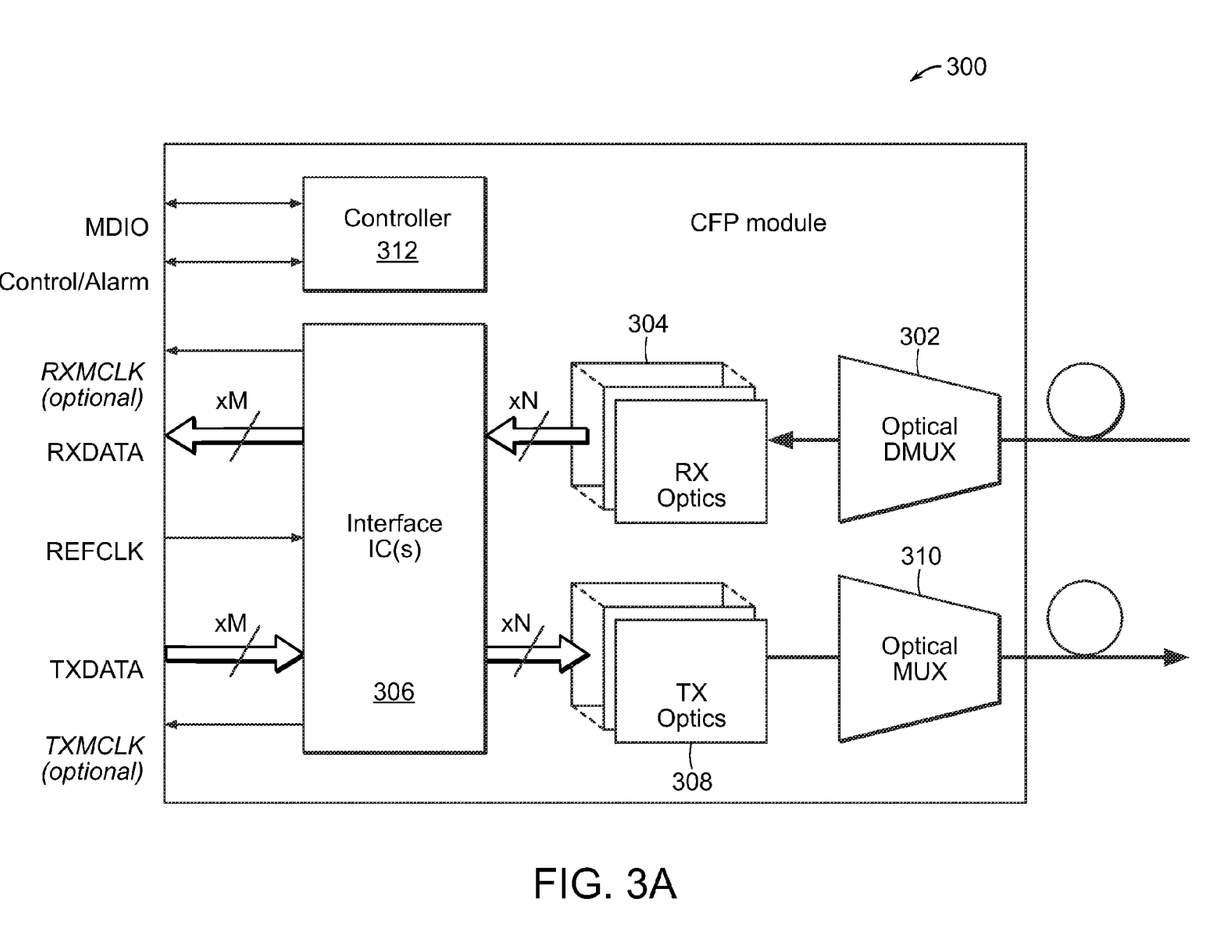
FIG. 3A illustrates a block diagram of one particular industry standard pluggable interface that uses the industry standard CFP MSA Hardware Specification which specifies the use of the high-speed Management Data Input/Output (MDIO) standard as the management interface between the host and the module.

FIG. 3A illustrates a block diagram 300 of one particular industry standard pluggable interface that uses the industry standard CFP MSA Hardware Specification, which specifies the use of the high-speed Management Data Input/Output (MDIO) standard as the management interface between the host and the module. The high-speed MDIO interface definition is specified by IEEE 802.3 Clause 45 and defines a set of high-speed MDIO registers suitable for CFP module applications. The Hardware Specification describes the hardware aspects of the high-speed MDIO interface, such as its electrical characteristics and timing requirements.

The CFP block diagram 300 includes a CFP module having an input optical demultiplexer 302 that is optically coupled to receiver optics 304. The detected signals are electrically connected to an electronic interface 306. The electronic interface 306 provides the received data and receives clock signals that are passed to the other components. In addition, the electronic interface 306 receives transmission data and passes it to the transmit optics 308. An optical multiplexer 310 is optically coupled to the transmit optics 308. The CFP module also includes a controller 312 that includes a high-speed MDIO interface.

Figure 3B:
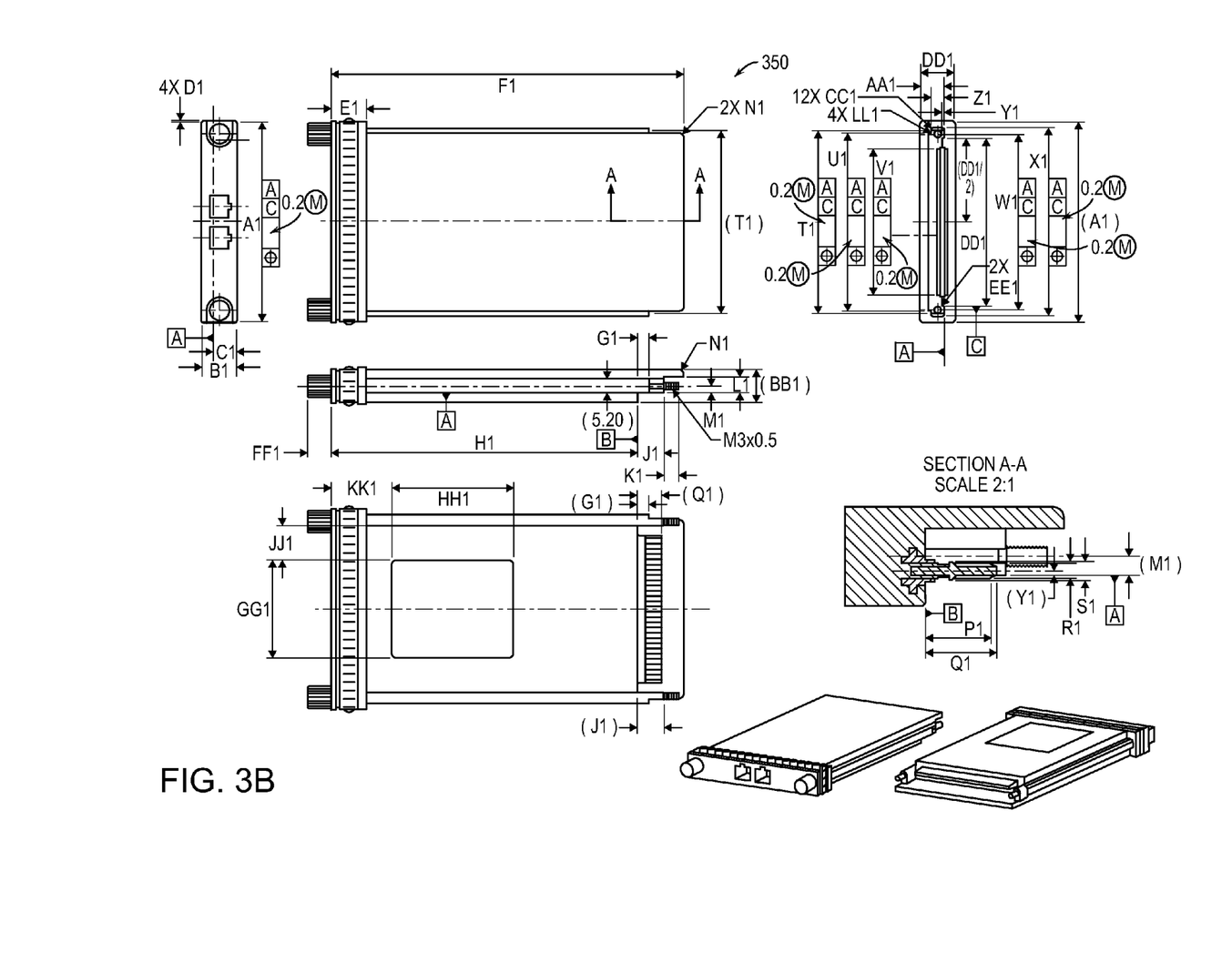
FIG. 3B illustrates a mechanical diagram of a CFP module that can be used in the linecards and pluggable devices according to the present teaching.
Figure 3C:
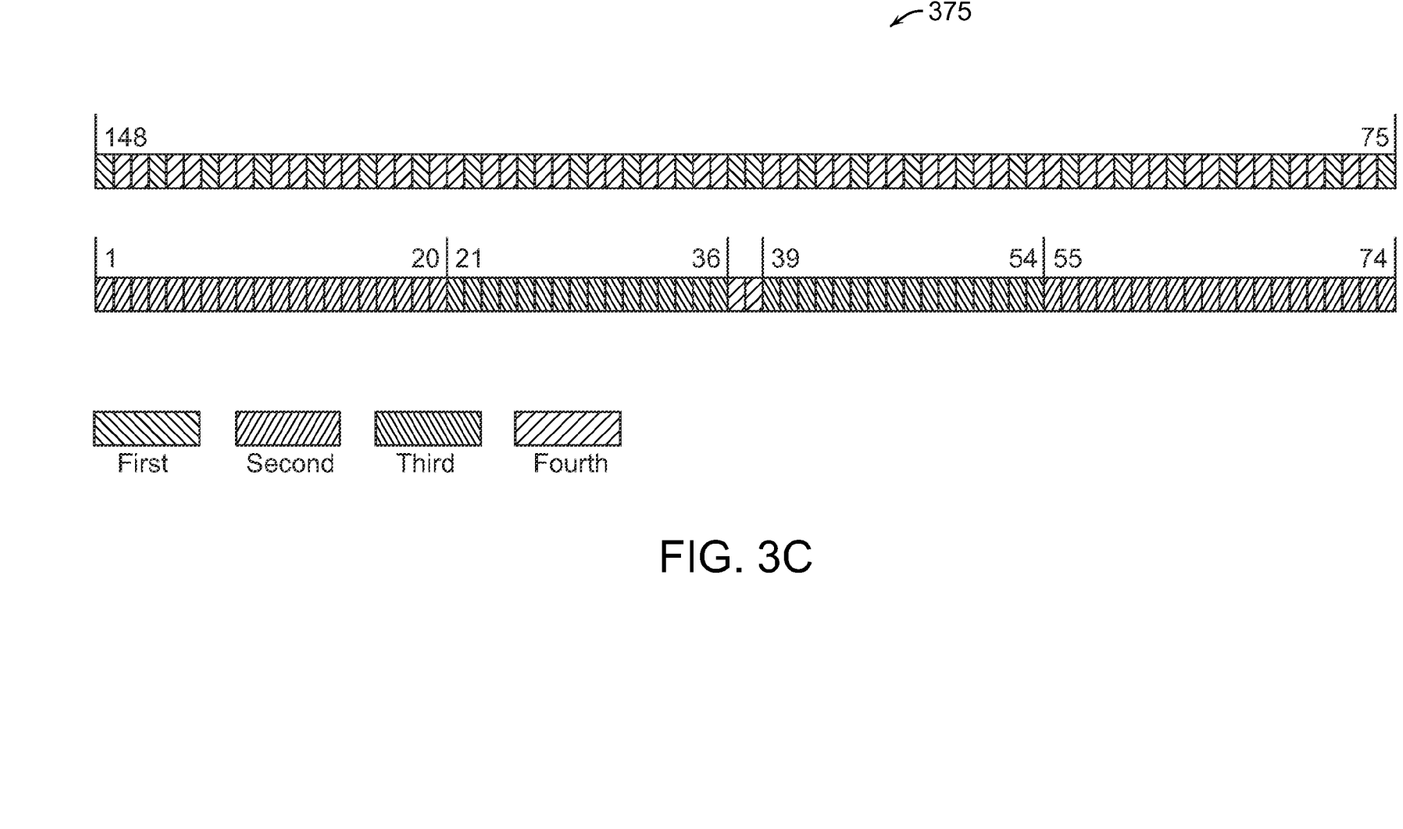
FIG. 3C illustrates a CFP module electrical connector diagram that illustrates the pin map connector engagement.

FIG. 3B illustrates a mechanical diagram of a CFP module 350 that can be used in the linecards and pluggable devices according to the present teaching. The mechanical aspect of the CFP module 350 is designed according to the C form-factor pluggable (CFP) standard, which is derived from a multi-source agreement to produce a common form-factor for the transmission of high-speed digital signals. FIG. 3C illustrates a CFP module electrical connector diagram 375 that illustrates the pin map connector engagement.

Certain modifications of the optical amplifier pluggable devices need to be made for some pluggable interfaces. For example, with small format interfaces, such as the XFP interface, the optical amplifier pluggable will require more compact designs that still provide acceptable fiber bend radiuses. Using some bulk optics and micro bend radius fiber it is possible to create an extremely small and compact EDFA that can fit into the XFP and CFP4 form factors. The XFP form factor standard is a 10 Gigabit Small Form Factor Pluggable, which is commonly used for transceivers in high-speed fiber optic computer network and telecommunication links.

Furthermore, the CFP2 form factor could possibly enable a dually packed version. The CFP2 form factor is the follow-on module to the CFP and is about half the size of the CFP, and it typically consumes about half the power.

Figure 4A:
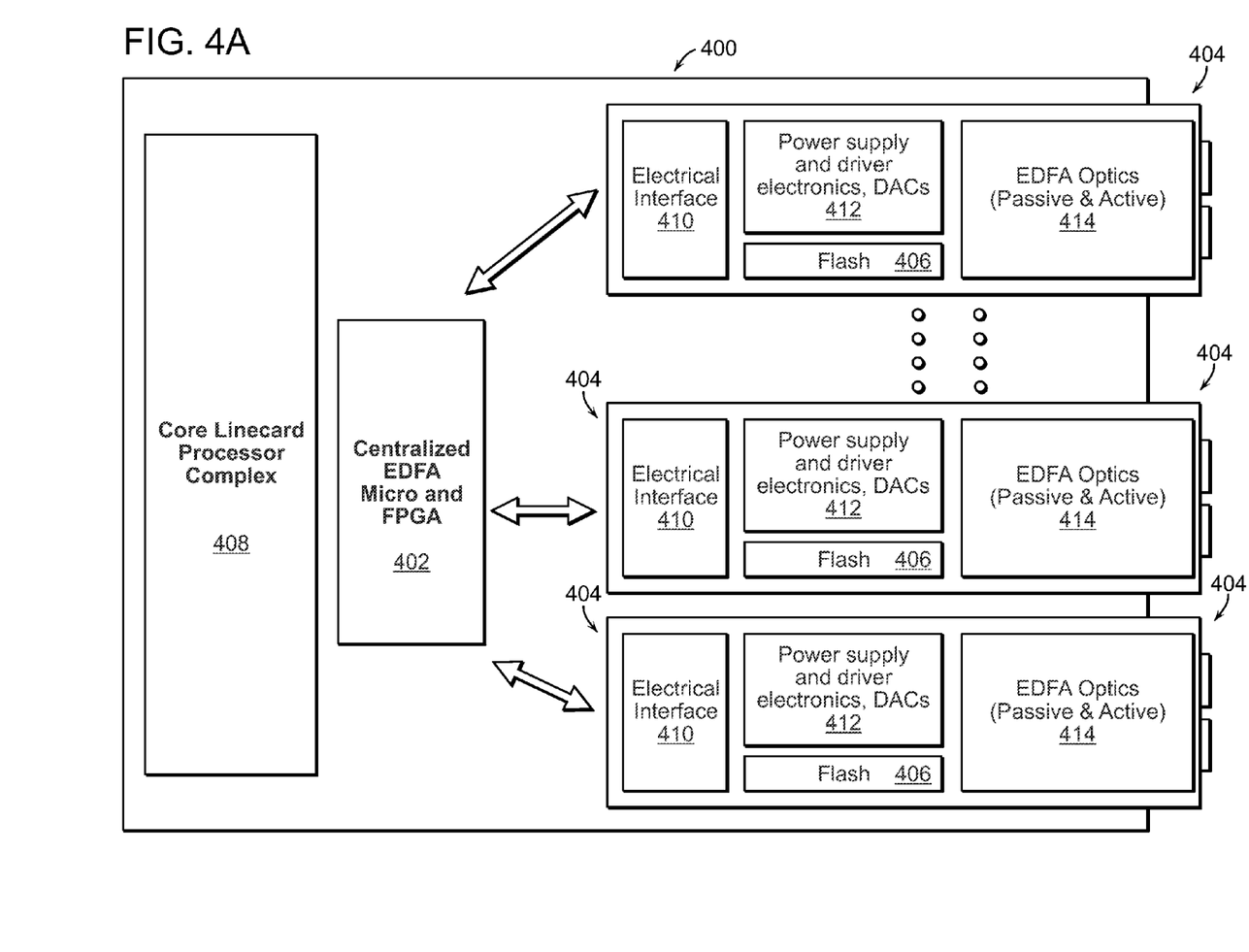
FIG. 4A illustrates a block diagram of a linecard with a host processor or field programmable gate array (FPGA) that is used to control pluggable devices, where flash memory is integrated into the pluggable module.

In another aspect of the present teaching, flash memory is integrated in the pluggable module and/or is integrated on the main linecard. FIG. 4A illustrates a block diagram of a linecard 400 with a host processor or field programmable gate array (FPGA) 402 that is used to control pluggable devices 404, where the flash memory 406 is integrated into the pluggable module 404. The linecard 400 includes a linecard processor 408 in addition to the host processor and/or field programmable gate array (FPGA) 402, which is a centralized EDFA microprocessor and/or FPGA. In the embodiment shown, the pluggable device 404 includes a pluggable electronic interface 410, which can be any industry standard or proprietary interface. The pluggable devices 404 also include a power supply and driver electronics including digital-to-analog converters 412. The pluggable devices 404 also include the pluggable functional components which, in the embodiment shown, are the passive and active EDFA optics 414. However, it should be understood that the present invention applies to other functional components.

In addition, the pluggable devices 404 include the on-board flash memory 406. Integrating the flash memory 406 into the pluggable device 404 has the feature of allowing the supplier to load data, such as calibration data for the EDFA pump/PD, based on the intended operation of the pluggable device 404, such as the EDFA operation.

Figure 4B:
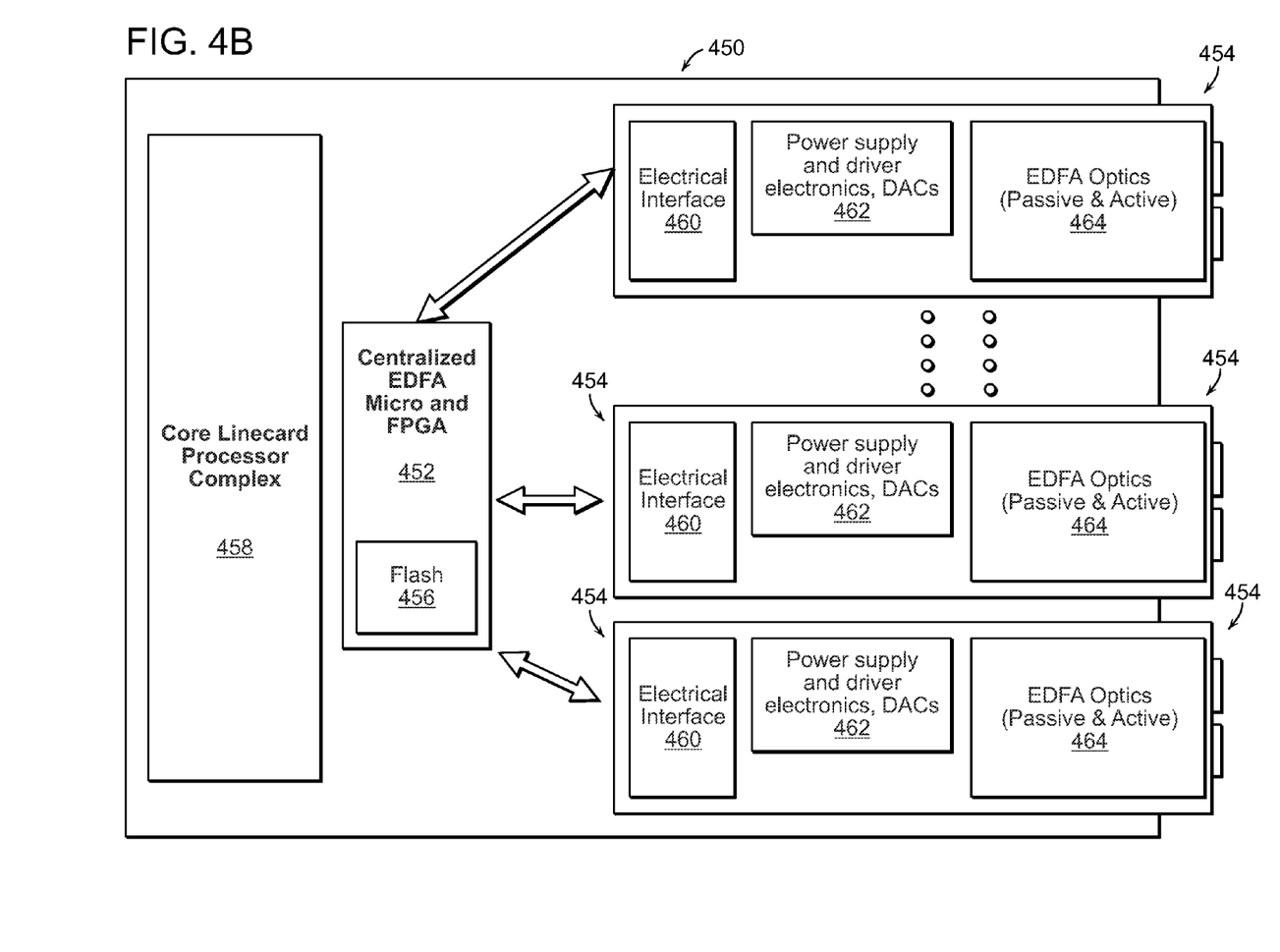
FIG. 4B illustrates a block diagram of a linecard with a host processor or field programmable gate array (FPGA) that is used to control pluggable devices, where the flash memory is integrated into the main linecard.

FIG. 4B illustrates a block diagram of a linecard 450 with a host processor or field programmable gate array (FPGA) 452 that is used to control pluggable devices 454, where the flash memory 456 is integrated into the main linecard. The linecard 450 includes a linecard processor 458 in addition to the host processor and/or field programmable gate array (FPGA) 452, which is a centralized EDFA microprocessor or FPGA. The pluggable devices 454 can include pluggable optical amplifiers (POAs) or any other type of pluggable device. In the embodiment shown, the pluggable device 454 includes a pluggable electronic interface 460, which can be any industry standard or proprietary interface. The pluggable devices 454 also include a power supply and driver electronics including digital-to-analog converters 462. The pluggable devices 454 also include the pluggable functional component which, in the embodiment shown, is the passive and active EDFA optics 464. However, it should be understood that the present invention applies to other functional components.

The main linecard includes on-board flash memory 456. Integrating the flash memory 456 into the main linecard allows for highly scalable architectures. One aspect of the linecards of the present teaching is that the pluggable devices do not have to be present to operate the linecard. Also, a system-on-a-chip architecture can be used to control the pluggable optical modules.

Thus, one aspect of the linecard with pluggable interfaces, according to the present teaching, is that the linecards are highly flexible in that they can be configured with numerous types of pluggable devices, such as optical amplifier devices and ROADM devices, to perform various functions. Another aspect of the linecards with pluggable interfaces, according to the present teaching, is that the linecards can provide complex system functionality at a relatively low cost. Yet another aspect of the linecard with pluggable interfaces, according to the present teaching, is that the linecards can have numerous form factors, including reduced size form factors.

EQUIVALENTS

While the applicants' teaching is described in conjunction with various embodiments, it is not intended that the applicants' teaching be limited to such embodiments. On the contrary, the applicants' teaching encompass various alternatives, modifications, and equivalents, as will be appreciated by those of skill in the art, which may be made therein without departing from the spirit and scope of the teaching.

What is claimed is:

1. A linecard comprising:
    a) a linecard processor;
    b) a centralized host processor;
    c) a plurality of pluggable interfaces; each of the plurality of pluggable interfaces electrically coupled to the centralized host processor;
    d) a plurality of pluggable devices, each of the plurality of pluggable devices being electrically coupled to one of the plurality of pluggable interfaces, wherein at least one of the plurality of pluggable devices comprises a pluggable EDFA optical amplifier device comprising a drive circuit and a digital-to-analog converter that converts digital signals which instruct the drive circuit to control a gain and a power of an EDFA, wherein each of the plurality of pluggable devices is controlled by the centralized host processor; and
    e) a flash memory that stores calibration data for the pluggable EDFA optical amplifier device.

2. The linecard of claim 1 wherein the linecard processor and the centralized host processor comprise a single processor unit.

3. The linecard of claim 1 wherein the centralized host processor comprises an FPGA.

4. The linecard of claim 1 wherein the centralized host processor comprises a microprocessor.

5. The linecard of claim 1 wherein the centralized host processor comprises both a microprocessor and a FPGA.

6. The linecard of claim 1 wherein the centralized host processor comprises the flash memory.

7. The linecard of claim 1 wherein the pluggable EDFA optical amplifier device comprises the flash memory.

8. The linecard of claim 1 wherein the interface that supports a pluggable device comprises an industry standard interface.

9. The linecard of claim 8 wherein the industry standard interface is selected from the group consisting of CFP, CFP2, CFP4, and XFP.

10. The linecard of claim 1 wherein the interface that supports a pluggable device comprises proprietary interface.

11. The linecard of claim 1 wherein the interface that supports a pluggable device comprises a plurality of different interfaces.

12. A linecard comprising:
    a) a linecard processor;
    b) a centralized host processor;
    c) a plurality of pluggable interfaces, each of the plurality of pluggable interfaces electrically coupled to the centralized host processor;
    d) a plurality of pluggable devices, each of the plurality of pluggable devices being electrically coupled to one of the plurality of pluggable interfaces, wherein at least one of the plurality of pluggable devices comprises a pluggable EDFA optical amplifier device, and wherein each of the plurality of pluggable devices are being controlled by the centralized host processor;
    e) at least one optical detector positioned within the pluggable EDFA optical amplifier device comprising an EDFA, the at least one optical detector detecting optical power at the output of the EDFA and generating signals that control at least one of a gain and a power of the EDFA; and f) a flash memory that stores calibration data for the pluggable EDFA optical amplifier device.

13. The linecard of claim 12 wherein the centralized host processor comprises the flash memory.

14. The linecard of claim 12 wherein the pluggable EDFA optical amplifier device comprises the flash memory.

15. The linecard of claim 12 further comprising a pluggable device comprising a ROADM device that is electrically coupled to the interface, the ROADM device being controlled by the centralized pluggable host processor.

16. The linecard of claim 12 wherein the linecard processor and the centralized host processor comprise a single processor unit.

17. The linecard of claim 1 wherein the linecard comprises a ROADM.

18. The linecard of claim 1 wherein the pluggable EDFA optical amplifier device being controlled by the centralized host processor is EDFA gain controlled.

19. The linecard of claim 1 wherein the pluggable EDFA optical amplifier device being controlled by the centralized host processor is EDFA power controlled.

20. The linecard of claim 1 wherein the pluggable EDFA optical amplifier device being controlled by the centralized host processor is fast transient response controlled.

21. The linecard of claim 1 wherein the pluggable EDFA optical amplifier device comprises microbend radius fiber.

22. The linecard of claim 1 wherein the pluggable EDFA optical amplifier device comprises an optical pump that generates gain.

23. The linecard of claim 1 wherein the pluggable EDFA optical amplifier device comprises at least one of an optical detector that is positioned to detect optical power at an input of the pluggable EDFA and an optical detector that is positioned to detect optical power at an output of the pluggable EDFA, wherein the at least one optical detector generates signals that control a gain of the pluggable EDFA.

24. The linecard of claim 1 wherein the pluggable EDFA optical amplifier device comprises at least one of an optical detector that is positioned to detect optical power at an input of the pluggable EDFA and an optical detector that is positioned to detect optical power at an output of the pluggable EDFA, wherein the at least one optical detector generates signals that control a power of the pluggable EDFA.

25. The linecard of claim 11 wherein the plurality of pluggable devices comprises at least one ROADM device.

* * * * *